Feb. 27, 1973   B. F. WILSON   3,717,999
LOW L/D ROCKET ENGINE WITH TANGENTIAL-TANGENTIAL INJECTION
Filed Dec. 5, 1969

Ben F. Wilson,
INVENTOR

United States Patent Office 3,717,999
Patented Feb. 27, 1973

3,717,999
LOW L/D ROCKET ENGINE WITH TANGENTIAL-TANGENTIAL INJECTION
Ben F. Wilson, Huntsville, Ala., assignor to the United States of America as represented by the Secretary of the Army
Filed Dec. 5, 1969, Ser. No. 885,393
Int. Cl. F02k 9/02
U.S. Cl. 60—258                                            6 Claims

ABSTRACT OF THE DISCLOSURE

A rocket engine with a low combustion chamber length to diameter ratio that is accomplished by injecting both the fuel and oxidizer tangentially into a cylindrical combustion chamber that has only a diverging exhaust nozzle. By injecting the fuel and oxidizer tangentially, a smaller combustion chamber can be used, and the exhaust nozzle may be only a diverging nozzle.

BACKGROUND OF THE INVENTION

In rocket engines for missiles it has always been desirable to make the engine as small and light as possible. A further consideration that must be considered, is fabrication cost. Conventional rocket engines that are highly efficient have a conventional combustor that normally requires an L* of 40 inches and a chamber-to-throat diameter ratio of approximately 2.5 to 1. A decreased volume could be obtained by reducing the L* to 20 inches; however, little if any reduction in weight or fabrication cost could be expected. Accordingly, a new approach to a rocket engine is needed in order to obtain a rocket engine that is small, light and easily fabricated.

Therefore, it is an object of this invention to provide a rocket engine that has a low L/D combustion chamber.

Another object of the invention is to provide a rocket engine that has tangential-tangential injection.

A further object of this invention is to provide a rocket engine that has a non-converging nozzle.

Still another object of this invention is to provide a rocket engine, in comparison to the conventional rocket engine, that has a reduction in volume, weight and fabrication cost.

SUMMARY OF THE INVENTION

In accordance with this invention, a rocket engine is provided that has a small cylindrical combustion chamber with tangential-tangential injection means for the oxidizer and fuel to be injected into the combustion chamber from the radial periphery of the combustion chamber. A diverging nozzle is utilized with the small cylindrical combustion chamber to make a short and compact rocket engine that has high performance capabilities.

BRIEF DESCRIPTION OF THE DRAWING

In the accompanying drawing forming a part of this specification, and in which like numerals are employed to designate corresponding parts throughout the same.

DESCRIPTION OF THE PREFERRED EMBODIMENT

Figure 1:
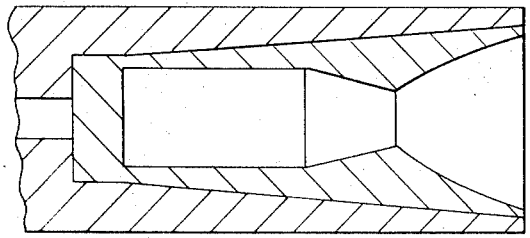
FIG. 1 is a sectional view, partially cut away and schematically representing a rocket with a conventional rocket engine.
Figure 2:
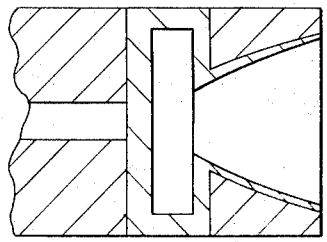
FIG. 2 is a sectional view, partially cut away and schematically representing a rocket with a short rocket engine according to this invention.
Figure 3:
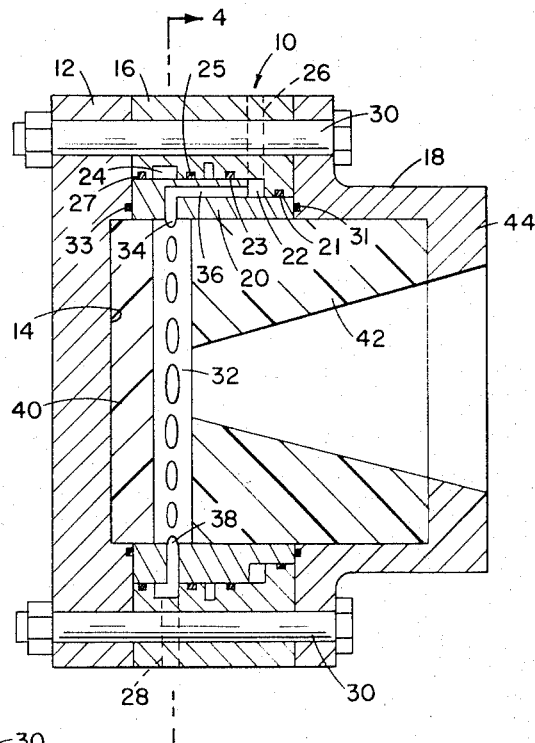
FIG. 3 is a sectional view of the rocket engine according to this invention; and, FIG. 4 is a sectional view, of the rocket engine, which is taken looking in the direction of section line 4—4 of FIG. 3.
Figure 4:
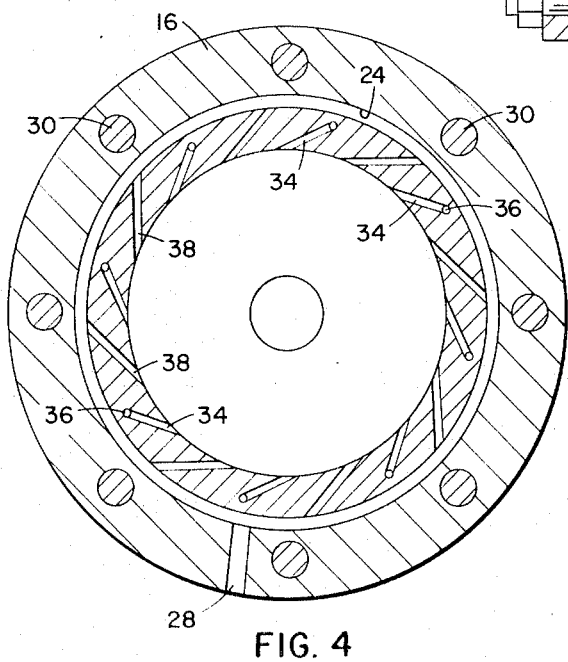

Referring now to FIG. 3, rocket engine 10 includes a front plate 12 with cavity 14 therein, an intermediate section 16, a rear nozzle section 18 and an injection section 20 that defines with intermediate section 16, oxidizer chamber 22 and fuel chamber 24. Inlet passage 26 communicates with oxidizer chamber 22, and inlet passage 28 communicate with fuel chamber 24. Oxidizer chamber 22 is sealed by O-rings 21 and 23, and fuel chamber 24 is sealed by O-rings 25 and 27. A plurality of bolts 30 clamp the housing sections together to define combustion chamber 32, and O-rings 31 and 33 seal the housing sections relative to chamber 32. A plurality of oxidizer injection orifices 34 (see FIG. 4) tangentially inject the oxidizer from chamber 22 to combustion chamber 32 by way of passages 36. Fuel injection orifices 38 directly communicate fuel from fuel chamber 24 to combustion chamber 32. Fuel injection orifices 38 open tangentially into combustion chamber 32 and are alternately spaced with oxidizer injection orifices 34 as illustrated in FIG. 3. If more than one ring of injection orifices are needed for a particular size rocket engine, a plurality of circumferential rows of orifices can be used. Also, when more than one row of circumferential orifices is used, the exit end of each orifice should be staggered relative to the exit ends of the other orifices. The size of the fuel and oxidizer orifices are chosen in accordance with the desired volume of fuel and oxidizer flow.

Chamber 32 has ablative insulation means 40 seated in cavity 14 and diverging nozzle insert portion 42 at the nozzle end. Nozzle insert portion 42 is supported by flanged portion 44 of rear nozzle section 18 to define an extended part of the diverging nozzle for the rocket engine. Nozzle insert portion 42 may be made of any conventional nozzle insert material and will depend upon the particular type performance desired of the rocket engine.

OPERATION

Oxidizer and fuel are injected by conventional system control means (not shown) into chambers 22 and 24 by way of inlet passages 26 and 28. The fuel and oxidizer are then injected tangentially into the combustion chamber where they ignite hypergolically as they swirl through the combustion chamber and out the exhaust nozzle as exhaust products. Mixing of the fuel and oxidizer occurs near the outer wall, and combustion occurs as the fluids swirl toward the enter. The vortex pattern increases the flow path of the materials and permits good combustion in a relatively small volume. The fuel and oxidizer entering the combustion chamber at the periphery cool and protect the periphery from the high temperature combustion gases.

The table herein below shows a comparison of the low L/D rocket engine to a conventional rocket engine:

|  | Conventional | Low L/D |
|---|---|---|
| Thrust (lbs. force) | 1,200 | 1,200 |
| Chamber pressure (p.s.i.) | 1,200 | 1,200 |
| Throat diameter (in.) | 0.886 | 0.886 |
| Chamber diameter (in.) | 2.3 | 4.0 |
| Chamber length (in.) | 6.5 | 0.5 |
| Volume (in.³) | 25 | 6.3 |
| L* (inches) | 40 | 10 |
| L/D | 2.8 | 0.125 |

*Chamber volume/throat area.

It is to be understood that the form of my invention, herewith shown and described, is to be taken as a preferred example of the same, and that various changes in

I claim:

1. A rocket engine comprising a housing having a cylindrical combustion chamber with a diameter greater than at least twice the length of said chamber, a rocket nozzle in communication with said combustion chamber, injection orifices in said housing for injecting both fuel and oxidizer and opening tangentially into said combustion chamber about the periphery of said combustion chamber, said fuel and oxidizer injection orifices being at least four in number and alternate about the periphery of said combustion chamber, means for communicating fuel and oxidizer to said injection orifices and ablative insulation means at the front of the combustion chamber and opposite said rocket nozzle.

2. A rocket engine as set forth in claim 1, wherein said communicating means includes a fuel chamber in said housing in communication with said injection orifices for said fuel and an oxidizer chamber in said housing in communication with said injection orifices for said oxidizer, wheren said fuel chamber and said oxidizer chamber are defined in two members that are telescoped together, said fuel chamber being defined by a space between said telescoped members that is near one end of said members and said oxidizer chamber being defined by a space between said telescoped members that is near the other end of said members, and wherein seals are mounted relative to said telescoped members to seal said oxidizer and fuel chambers.

3. A rocket engine as set forth in claim 1, wherein said exhaust nozzle is a diverging nozzle that communicates exhaust gases directly from said combustion chamber, and wherein said nozzle, in part, is in the form of an insert that forms a planar wall of said combustion chamber, said exhaust nozzle diverging in diameter from an entrance at said planar wall to an exit end thereof.

4. A rocket engine as set forth in claim 1, wherein the length to diameter ratio of said combustion chamber is 0.125.

5. A rocket engine as set forth in claim 1, wherein said fuel injection orifices are 8 in number and said oxidizer injection orifices are 8 in number.

6. A rocket engine as set forth in claim 1, wherein said combustion chamber is defined by two planar surfaces that are joined by a cylindrical surface, said exhaust nozzle is a frusto-conical diverging nozzle that diverges outwardly from said combustion chamber at one of said planar surfaces of said combustion chamber to an exit end, said communicating means includes a fuel chamber in said housing in communication with said injection orifices for said fuel and an oxidizer chamber in said housing in communication with said injection orifices for said oxidizer, and wherein said fuel and oxidizer orifices open through said cylindrical surface.

References Cited
UNITED STATES PATENTS

| | | | |
|---|---|---|---|
| 2,286,909 | 6/1942 | Goddard | 60—258 |
| 2,602,290 | 7/1952 | Goddard | 60—39.74 A |
| 2,975,588 | 3/1961 | Smith | 60—203 |
| 3,011,309 | 12/1961 | Carter | 60—242 |
| 3,568,445 | 3/1971 | Munding et al. | 60—258 |
| 3,350,886 | 11/1967 | Feraud et al. | 60—204 |
| 3,296,803 | 1/1967 | Kroekel | 60—259 |
| 2,936,577 | 5/1960 | Amneus | 60—258 |
| 3,169,368 | 2/1965 | Munding | 60—258 |

SAMUEL FEINBERG, Primary Examiner